United States Patent
Yoo

(10) Patent No.: US 7,031,103 B2
(45) Date of Patent: Apr. 18, 2006

(54) HARD DISK DRIVE HAVING DISK LOCKING APPARATUS UTILIZING OFFSET DUMMY SLIDER/SUSPENSION ARRANGEMENT

(75) Inventor: Yong-chul Yoo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 185 days.

(21) Appl. No.: 10/387,837

(22) Filed: Mar. 14, 2003

(65) Prior Publication Data
US 2003/0179491 A1  Sep. 25, 2003

(30) Foreign Application Priority Data
Mar. 25, 2002 (KR) ................. 2002-16086

(51) Int. Cl.
*G11B 5/012* (2006.01)
*G11B 5/48* (2006.01)
*G11B 5/55* (2006.01)
*G11B 17/022* (2006.01)
*G11B 17/038* (2006.01)

(52) U.S. Cl. ............... 360/97.01; 360/98.01; 360/244.2; 360/246.5; 360/246.8; 360/265.9

(58) Field of Classification Search ............ 360/97.01, 360/97.02, 97.03, 98.01, 246.8, 244.2, 246.1, 360/246.2, 246.5, 265.7, 265.9
See application file for complete search history.

(56) References Cited

U.S. PATENT DOCUMENTS 5,189,574 A * 2/1993 Imamura et al. ......... 360/266.2
2002/0003681 A1 * 1/2002 Takegawa ................ 360/244

FOREIGN PATENT DOCUMENTS

JP    11-025403           1/1999
JP    2001273744 A  * 10/2001

* cited by examiner

*Primary Examiner*—Craig A. Renner
(74) *Attorney, Agent, or Firm*—Staas & Halsey, LLP

(57) ABSTRACT

A hard disk drive having a disk storing data, a spindle motor rotating the disk, an actuator having two arms disposed at both sides of the disk, and a disk locking apparatus locking the disk not to rotate by closely contacting a side surface of the disk when the disk stops rotating. A suspension supporting a record/reproduce slider is installed at a first arm disposed at one side surface of the disk. The disk locking apparatus is installed at a second arm disposed at the other side surface of the disk. The disk locking apparatus has a dummy suspension whose one end portion is installed at the second arm and has a predetermined elastic force, and a dummy slider installed at other end portion of the dummy slider, and locking a stopped disk to prevent movement of the stopped disk and damage to bearings of the spindle motor.

16 Claims, 6 Drawing Sheets

HARD DISK DRIVE HAVING DISK LOCKING APPARATUS UTILIZING OFFSET DUMMY SLIDER/SUSPENSION ARRANGEMENT

CROSS-REFERENCE TO RELATED APPLICATIONS

This application claims the benefit of Korean Patent Application No. 2002-16086 filed on Mar. 25, 2002, in the Korean Intellectual Property Office, the disclosure of which is incorporated herein by reference.

BACKGROUND OF THE INVENTION

1. Field of the Invention

The present invention relates to a hard disk drive, and more particularly, to a hard disk drive having a disk locking apparatus locking a disk so that the disk is not rotated when the hard disk drive is not operated, for example, when the hard disk drive is being carried/transported.

2. Description of the Related Art

A hard disk drive (HDD), which is one of the auxiliary memory devices of a computer, reads or records data with respect to a magnetic disk by using a magnetic head. Recently, various research and development efforts have realized high speed, high capacity, low vibration and low noise hard disk drives.

FIG. 1 is a top view illustrating a conventional hard disk drive. FIG. 2 is an enlarged perspective view illustrating part of the hard disk drive of FIG. 1. Referring to FIGS. 1 and 2, a hard disk drive includes a magnetic disk (hard disk) 20 that is a recording medium where data is recorded, a spindle motor 30 installed on a base plate 10 and rotating the disk 20, and an actuator 40 having a magnetic head 41 for recording and reproducing data with respect to the disk 20.

One or a plurality of disks, separated a predetermined distance from each other, are installed as the disk 20 and rotated by the spindle motor 30. A parking zone 21 where a slider 42 is accommodated when power is turned off is provided at the inner circumferential side of the disk 20. A data zone 22 where a magnetic signal is recorded is provided at the outer side of the parking zone 21. A servo signal for indicating the position of the information to be recorded is recorded in advance on tens of thousands of tracks along the circumference of the disk 20.

The actuator 40 pivots around a pivot shaft 47 installed on the base plate 10 by a voice coil motor 48. The actuator 40 includes an arm 46 coupled to the pivot shaft 47 to be capable of pivoting and a suspension 44 installed at the arm 46 and supporting the slider 42 where the magnetic head 41 is mounted to be elastically biased toward a surface of the disk 20.

When the power of the hard disk drive is turned off, the slider 42 is accommodated in the parking zone 21 of the disk 20 by an elastic force of the suspension 44. When the power is turned on and the disk 20 starts to rotate, lift is generated due to air pressure and the slider 42 is lifted. The slider 42 in a lifted state is moved to the data zone 22 of the disk 20 as the arm 46 pivots. The slider 42 moved to the data zone 22 of the disk 20 maintains a lifted state at a height where the lift by the rotation of the disk 20 and the elastic force by the suspension 44 are balanced. Thus, the magnetic head 41 mounted on the slider 42 records and reproduces data with respect to the disk 20 while maintaining a predetermined distance from the disk 20 that is rotating.

As described above, one or a plurality of disks are installed in the hard disk drive. Conventionally, four or more disks are installed in a hard disk drive to increase a data storage capacity. However, recently, as a surface recording density of a disk has increased, one or two disks can store a sufficient amount of data. Thus, recent hard disk drives mainly have one or two disks only.

FIGS. 3A through 3C are side views illustrating part of the hard disk drive shown in FIG. 1. First, FIG. 3A shows a 1-channel type hard disk drive using only one side of a disk to store data. Referring to FIG. 3A, the disk 20 is installed at the spindle motor 30 supported by the base plate 10 to be capable of rotating. Two arms 46a and 46b are coupled to the pivot shaft 47 supported by the base plate 10 to be capable of pivoting. As shown in FIG. 3A, when the bottom surface of the disk 20 is used as a recording surface, the suspension 44 is installed only at an end portion of the first arm 46a disposed under the disk 20 of the two arms 46a and 46b and the slider 42 where the magnetic head is mounted is installed at an end portion of the suspension 44. A dummy head 49 is installed at an end portion of the second arm 46b disposed above the disk 20 separated a predetermined distance from the surface of the disk 20. The dummy head 49 prevents unbalance of forces generated at both sides of the disk 20 during rotation of the disk 20, and has a weight approximately corresponding to the sum of weights of the suspension 44 and the slider 42.

Japanese Patent Laid-Open Publication No. hei 11-25403 entitled "Magnetic Recording and Reproduction Apparatus" discloses a 1-channel type hard disk drive. In the hard disk drive, a lift slider is installed at one side of a disk and a dummy slider is arranged at the opposite position. The dummy slider prevents warping of a relatively thin disk having a thickness of 0.5–1.2 mm, performing the same function as the dummy head shown in FIG. 3A.

FIG. 3B shows a 2-channel type hard disk drive in which both side surfaces of a disk are used for storing data. Referring to FIG. 3B, when both side surfaces of the disk 20 are used as recording surfaces, the suspension 44 is installed at the end portion of each of the two arms 46a and 46b and the slider 42 having the magnetic head mounted thereon is installed at the end portion of each suspension 44. Thus, the 2-channel type hard disk drive does not need the dummy head 49 shown in FIG. 3A.

However, as shown in FIG. 3C, three arms 46a, 46b, and 46c can be installed at the 1-channel and 2-channel type hard disk drive shown in FIGS. 3A and 3B, respectively, in which the 1-channel and 2-channel hard disk drives use parts in common (e.g., arm 46b is shared). In this case, a dummy head may be installed at the end portion of the third arm 46c where the suspension 44 is not installed. FIG. 3C shows a 3-channel type hard disk drive using three side surfaces of two disks for storing data. Referring to FIG. 3C, two disks 20a and 20b are installed at the spindle motor 30 supported by the base plate 10 to be capable of rotating. Three arms 46a, 46b, and 46c are coupled to the pivot shaft 47 supported by the base plate 10 to be capable of pivoting. As shown in FIG. 3C, when both side surfaces of the first disk 20a and the bottom surface of the second disk 20b are used as recording surfaces, the suspension 44 is installed at each end portion of the first arm 46a disposed under the first disk 20a and the end portion of the second arm 46b disposed between the first disk 20a and the second disk 20b. The slider 42 where the magnetic head is mounted is installed at the end portion of each suspension 44. A dummy head 49 is installed at the end portion of the third arm 46c disposed above the second disk 20b.

In the conventional hard disk drives having the above structures, vibrations are generated in a rotating disk due to defective parts of the spindle motor, defective assembly of the disk, and irregular flow of air in the hard disk drive. The vibrations can be divided into RRO (repeatable runout) that is a component repeated for each rotation, and NRRO (non-repeatable runout) that is not repeated for each rotation. RRO which repeats regularly can be compensated for by a servo control system to a degree, however, NRRO is difficult to compensate for in advance.

The vibrations of the disk, in particular, NRRO, is known to be caused mainly by a defect in a ball bearing in the spindle motor. The defect of the ball bearing of the spindle motor is frequently generated when the hard disk drive is carried/transported. When the hard disk drive is being carried, the disk can slightly rotate, so that the ball bearing in the spindle motor is partially abraded. That is, since lubricant is not uniformly distributed when the hard disk drive is not operated, if the stopped disk moves or rotates during transportation, a portion of the ball bearing where the lubricant is not provided can have friction with a shaft or a hub of the spindle motor, so that the surface of the ball bearing can be damaged. Further, recently, the thickness of the disk has increased roughly from 1 mm to 1.27 mm to reduce disk vibration. Accordingly, as the weight of the disk increases, the damage to the ball bearing by the rotation of the heavier disk increases.

In the meantime, in the case of an FDB (fluid dynamic bearing), since the size of a groove of a journal bearing or a thrust bearing is several micrometers, it can be easily damaged by a rotation of the disk when the disk drive is not operated, which typically can be generated when the hard disk drive is carried/transported. When the groove is damaged, since a pressure is not generated appropriately from the groove, a function of the FDB is not smoothly performed. The abrasion phenomenon occurring in a stopped bearing by an external vibration is referred to as fretting.

The abrasion phenomenon of the stopped bearing mainly occurs in the 1-channel type hard disk drive shown in FIG. 3A. Since the rotation of the disk 20, during which the hard disk drive is not operated, is prevented only by the one slider 42 contacting the parking zone of the lower surface of the disk 20, the disk 20 can be easily rotated when a small amount of external vibration is applied to the disk 20. However, in the 2-channel type hard disk drive shown in FIG. 3B, since two sliders 42 contact both side surfaces of the single disk 20 and elastic forces are acting in the opposite directions by the suspensions 44 at both sides of the disk 20, the disk 20 is not easily rotated by an external vibration. Also, in the 3-channel type hard disk drive shown in FIG. 3C, since the two disks 20a and 20b are supported by contacting the three sliders 42, the disk 20a is not easily rotated as the disk 20b.

As described above, when the bearing of the spindle motor is damaged by the rotation of the disk when the hard disk drive is carried/transported, vibrations are generated in the disk during the operation of the hard disk drive. The disk vibrations deteriorate data recording and reproduction capability of the magnetic head, so that the performance of the hard disk drive is badly affected. Also, the disk vibrations generate noise causing a work environment nuisance. Further, occurrences of fretting have increased because of increased recording density of each disk causing an increase in manufacture of 1-channel type hard disk drives, which are more susceptible to fretting.

SUMMARY OF THE INVENTION

The present invention provides a hard disk drive having a disk locking apparatus locking a disk not to rotate when the hard disk drive is not operated, for example, when it is carried/transported, to prevent disk vibrations due to damage of a bearing of a spindle motor.

More particularly, the present invention provides in a 1-channel type hard disk drive, a dummy slider functioning as a disk locking apparatus to prevent rotation of the disc when the hard disk drive is not operated, for example, when it is being carried. Further, the disk locking apparatus of the present invention prevents rotation of a relatively heavy disk, for example a disk having a thickness of about 1.27 mm, when the hard disk drive is not operating/inactive (e.g., turned off or not receiving power, while not recording/reproducing, etc.), thereby preventing damage to a stopped spindle motor ball bearing because of movement of the disk coupled to the spindle motor, such as rotation of the stopped disk, as weight and/or thickness of the disk increases.

Additional aspects and advantages of the invention will be set forth in part in the description which follows and, in part, will be obvious from the description, or may be learned by practice of the invention.

The present invention provides a hard disk drive comprising a disk storing data, having a parking zone and a data zone at one side surface thereof, a spindle motor installed on a base plate, and rotating the disk, and an actuator installed on the base plate to be capable of pivoting and having a first arm disposed at one side surface of the disk and a second arm disposed at the other side surface of the disk, wherein a suspension having a predetermined elastic force is installed at the first arm, and a slider with a mounted magnetic head recording and reproducing data is installed at an end portion of the suspension to be elastically biased toward the disk by the suspension, and a disk locking apparatus is installed at the second arm, and locking the disk not to move (e.g., further rotate) by closely contacting the other side surface of the disk when the disk stops rotating.

According to an aspect of the present invention the disk locking apparatus comprises a dummy suspension whose one end portion is fixedly installed at the second arm and which has a predetermined elastic force, and a dummy slider installed at other end portion of the dummy suspension, and locking the disk not to further rotate by closely contacting the other side surface of the disk by an elastic force of the dummy slider when the disk stops rotating.

According to an aspect of the present invention, when the disk stops rotating, the dummy slider is installed to be disposed at a position at an outer side of the slider.

According to an aspect of the present invention, a length of the dummy suspension is shorter than that of the suspension, and a length of the second arm installed at the dummy suspension is shorter than that of the first arm.

Therefore, when the hard disk drive is not operated, for example, when the hard disk drive is being carried, the disk is not rotated by the disk locking apparatus, so that damage of the bearing of the spindle motor due to the rotation of the disk is prevented.

BRIEF DESCRIPTION OF THE DRAWINGS

The advantages of the present invention will become apparent and more readily appreciated from the following description of the embodiments, taken in conjunction with the accompanying drawings of which:

FIGS. 3A through 3C are sectional views illustrating part of the hard disk drive of FIG. 1, in which FIG. 3A shows a 1-channel type hard disk drive, FIG. 3B shows a 2-channel type hard disk drive, and FIG. 3C shows a 3-channel type hard disk drive;

DETAILED DESCRIPTION OF THE PREFERRED EMBODIMENTS

Figure 1:
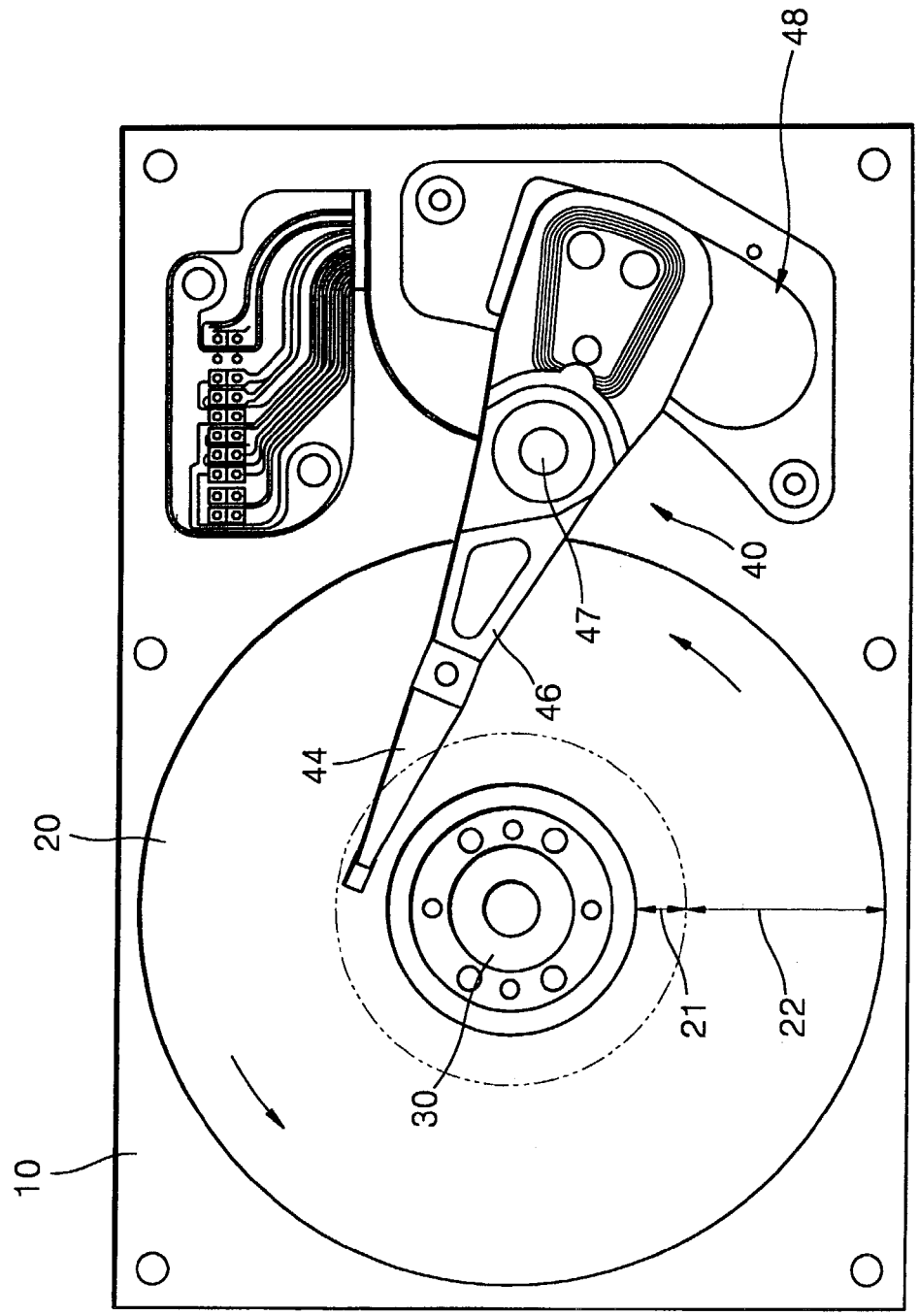
FIG. 1 is a top view illustrating a conventional hard disk drive.
Figure 2:
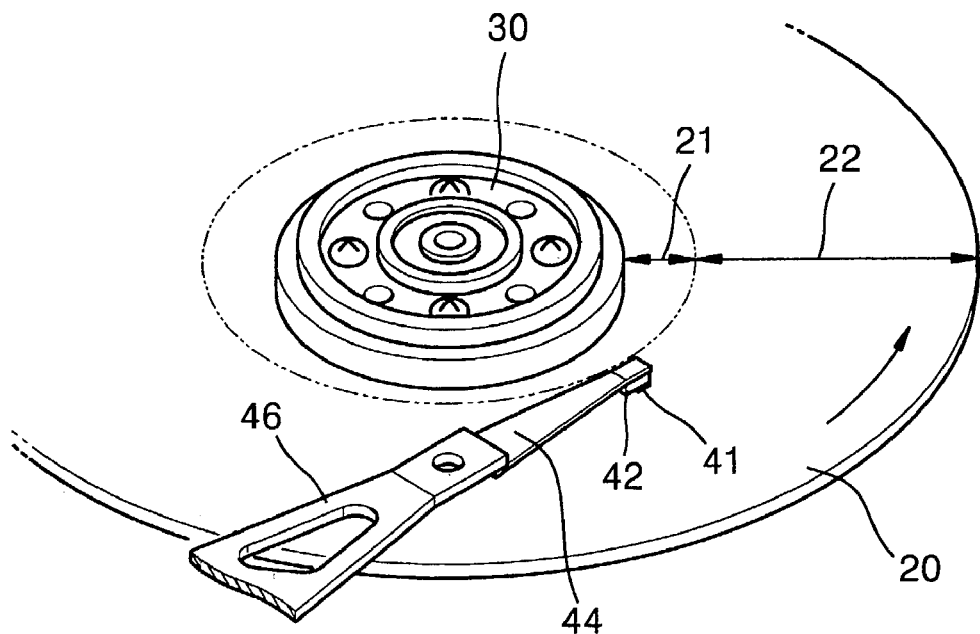
FIG. 2 is a partially cut-away perspective view illustrating part of the hard disk drive of FIG. 1.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
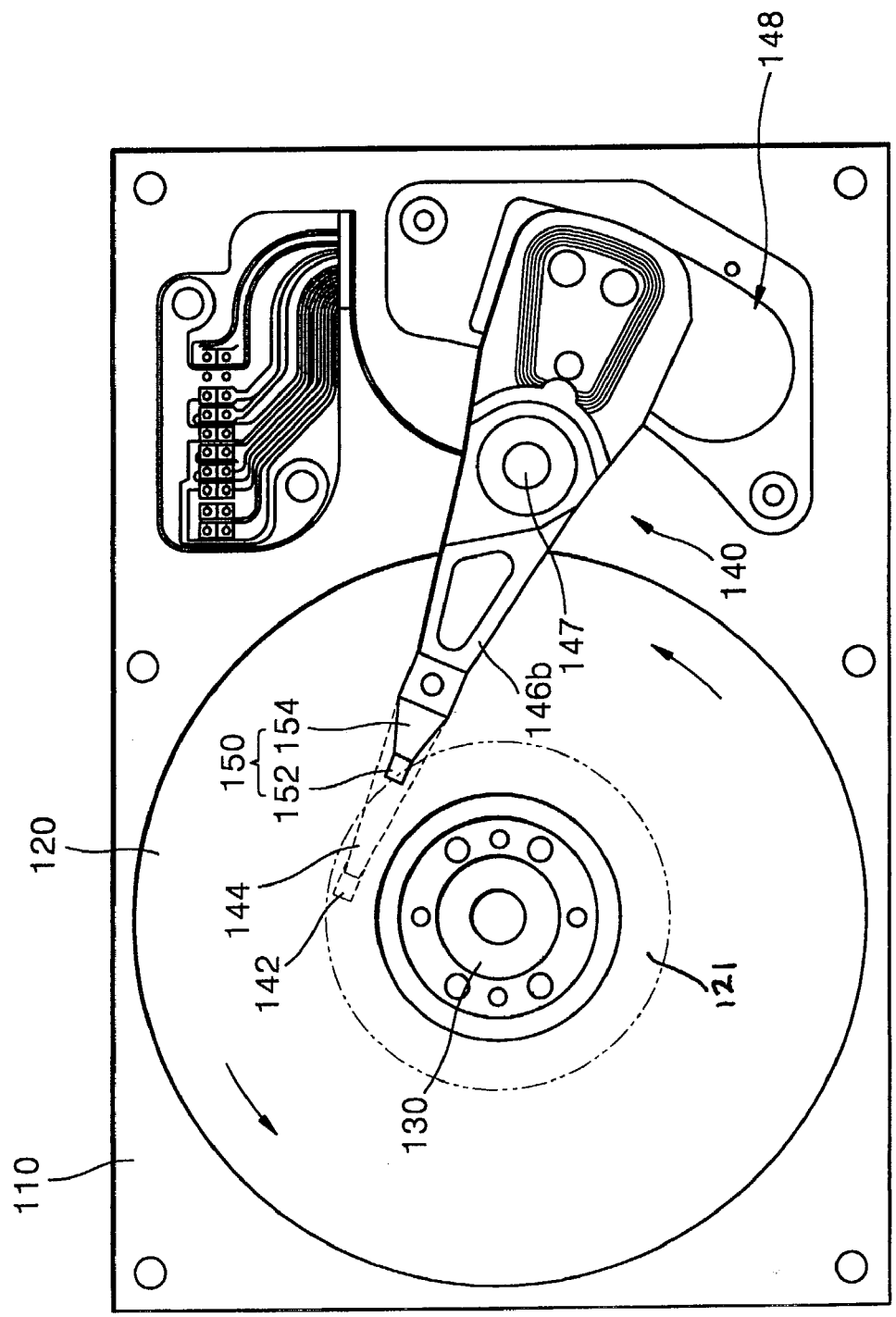
FIG. 4 is a top view illustrating a hard disk drive having a disk locking apparatus according to an embodiment of the present invention.
Figure 5:
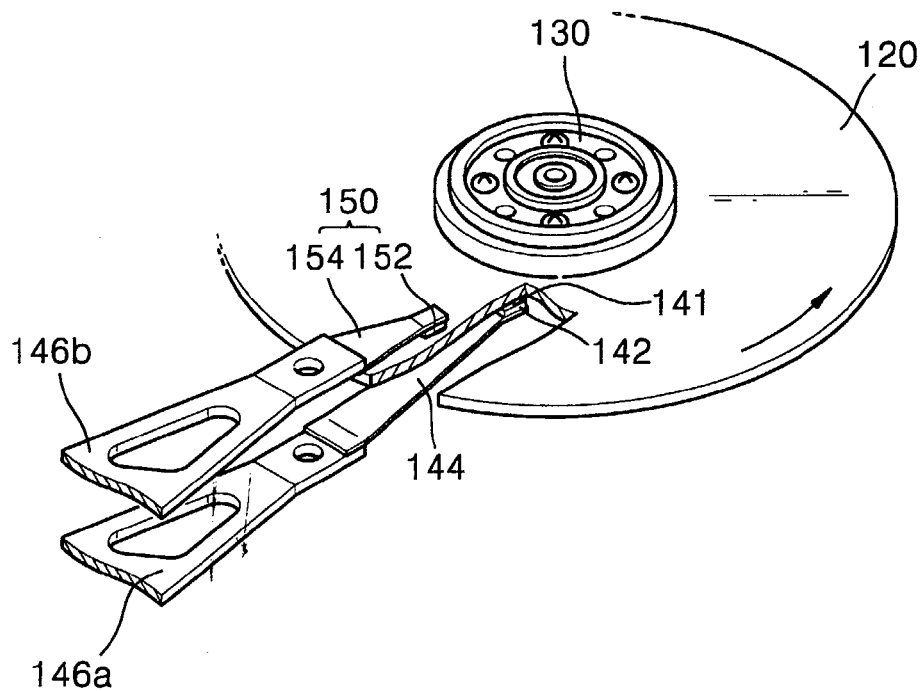
FIG. 5 is a partially cut-away perspective view illustrating the disk locking apparatus shown in FIG. 4.
Figure 6:
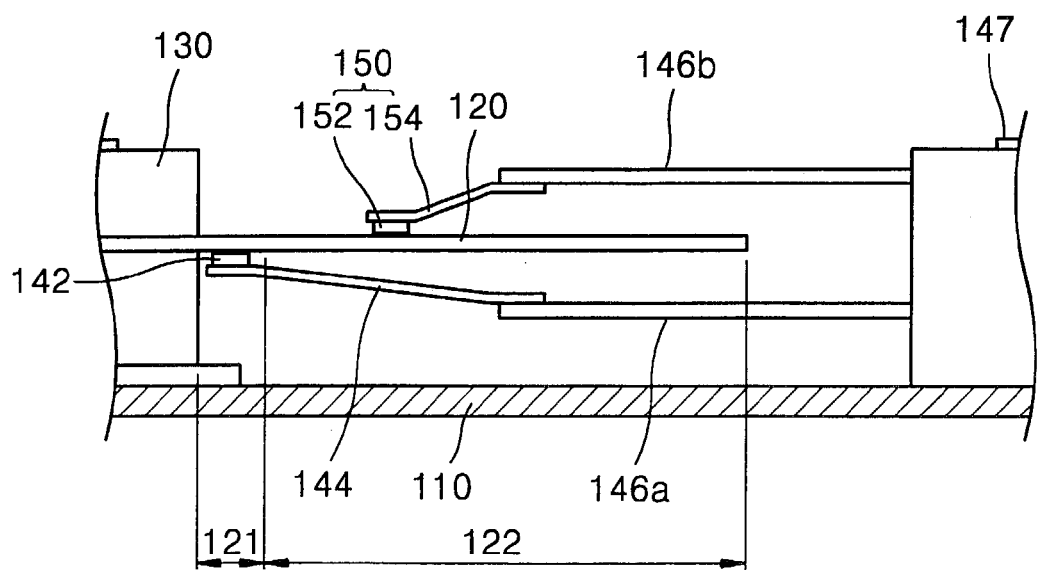
FIG. 6 is a side view of the disk locking apparatus shown in FIG. 4.

Referring to FIG. 4 through FIG. 6, a hard disk drive according to the an embodiment of present invention comprises a magnetic disk (hard disk) 120 that is a recording medium storing data, a spindle motor 130 installed on a base plate 110 and rotating the disk 120, an actuator 140 having a magnetic head 141 recording and reproducing data with respect to the rotating disk 120, and a disk locking apparatus 150 locking the disk 120 when the spindle motor 130 stops rotating the disk 120 or the disk stops rotating by closely contacting the upper surface of the stopped disk 120, so that the disk 120 does not move (e.g., further rotate) after the spindle motor 130 stops rotating the disk. In particular, the disk locker 150 locks the stopped disk 120. When the disk drive is not operating, the spindle motor 130 stops rotating the disk 120, thereby providing a stopped disk. The disk drive is not operating when, for example, the disk drive is turned off, not receiving power, inactive while not recording/reproducing, etc. Typically, a disk drive of a computer that is turned off or on would not be operating when the computer is being carried (transported).

The disk 120 is coupled to the spindle motor 130 and rotates together with the spindle motor 130. A parking zone 121 where a slider 142 having the magnetic head 141 is accommodated when power is turned off, that is, when the hard disk drive is not operated, is provided at the inner circumferential side (i.e., closer to the inner circumference of the disk 120 than to the outer circumference of the disk 120) of the lower surface of the disk 120. A data zone 122 where a magnetic signal is recorded is provided outside the parking zone 121. As shown in FIG. 6, in a 1-channel type hard disk drive, the parking zone 121 and the data zone 122 are typically provided at the lower surface of the disk 120. In this case, the disk locking apparatus 150 is disposed above the upper surface of the disk 120 as shown in FIG. 6. However, the parking zone 121 and the data zone 122 may be provided on the upper surface of the disk 120 contrary to the above arrangement. In this case, the disk locking apparatus 150 would be disposed at the lower surface of the disk 120. Here, the following description is based on a case in which the parking zone 121 and the data zone 122 are provided at the lower surface of the disk 120.

Figure 3A:
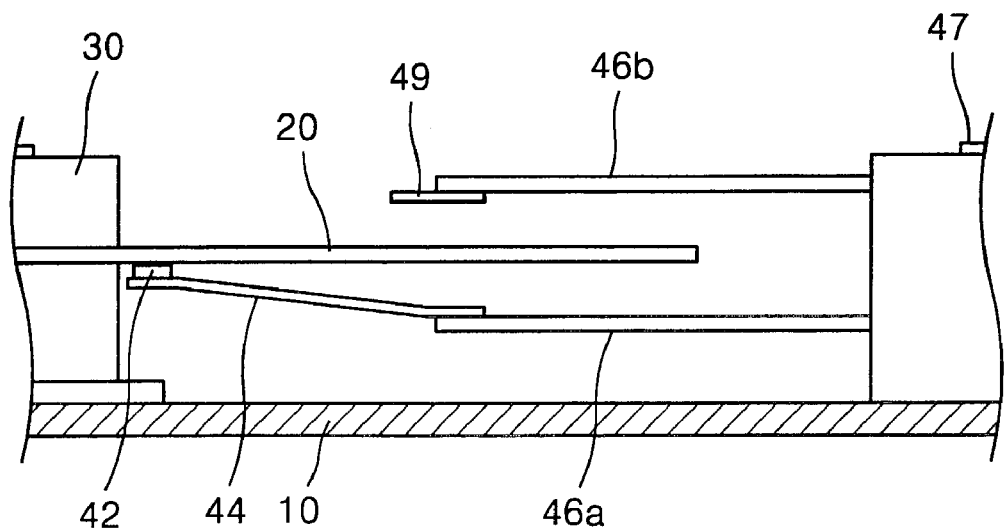
Figure 3B:
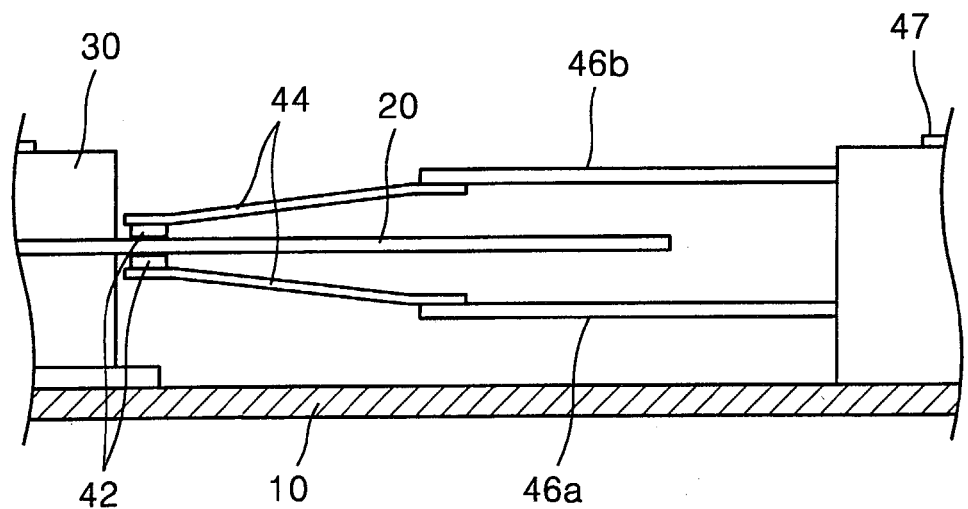
Figure 3C:
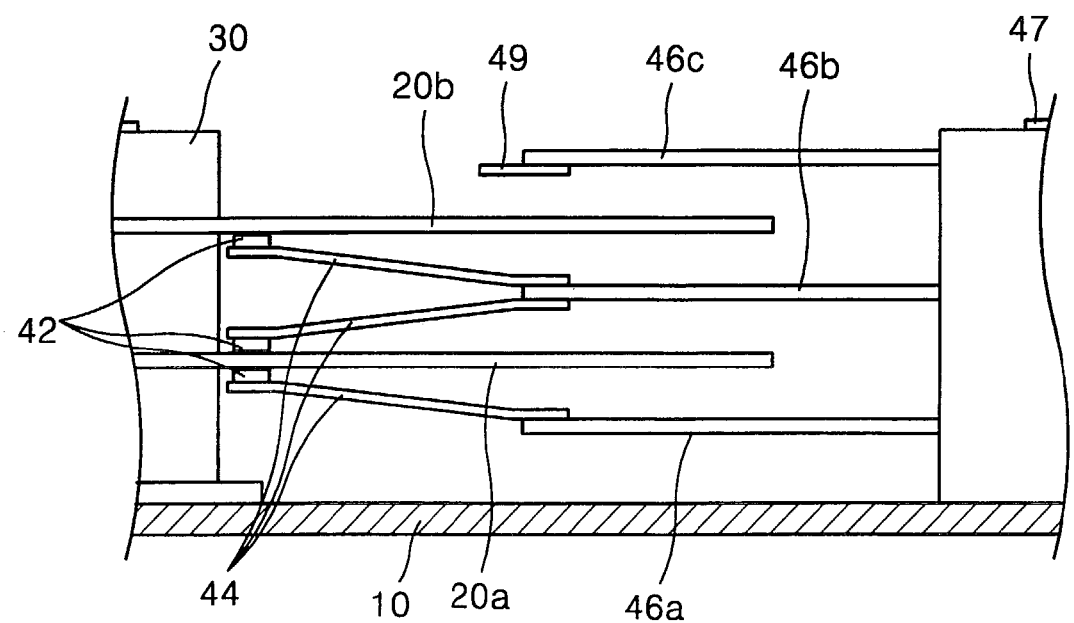

In FIG. 4, the actuator 140 pivots around a pivot shaft 147 installed on the base plate 110 by a voice coil motor 148. The actuator 140 comprises two arms 146a and 146b (shown in FIG. 5) that are coupled to the pivot shaft 147 to be capable of pivoting. The actuator can have three arms to accommodate two disks, in which the two disks use parts in common (e.g., in FIG. 6, the arm 146b can be shared by two disks 120 (not shown), see FIG. 3C).

A suspension 144 having a magnetic head 141 recording or reproducing data on or from the data zone 122 of the disk 120 when rotated is installed at a first arm 146a of the two arms disposed under the lower surface of the disk 120 where the data zone 122 is provided. The disk locking apparatus 150 is installed at a second arm 146b of the two arms disposed above the upper surface of the disk 120 where data is not recorded.

The disk locking apparatus 150 comprises a dummy suspension 154 having one end coupled to the second arm 146b and a dummy slider 152 installed at the other end of the dummy suspension 154. Typically, the dummy suspension 154 is fixedly installed to the second arm 146b. The dummy suspension 154 supports the dummy slider 152 to be elastically biased toward the upper surface of the disk 120. Thus, when the disk 120 stops rotating or not operating (e.g., when the disk drive is turned off, while not recording/reproducing, etc.), the dummy slider 152 closely contacts the upper surface of the disk 120 by an elastic force of the dummy suspension 154. During disk drive operation, when the disk 120 rotates by the spindle motor 130, the dummy slider 154 is lifted by lift generated by the rotation of the disk 120 to be separated a predetermined distance from the upper surface of the disk 120. Consequently, when the hard disk drive is not operated, the disk 120 is prevented from rotating by the dummy slider 152 and, during the operation, the disk 120 can be rotated by the spindle motor 130.

In FIG. 4, the rotation of the disk 120 is stopped, that is, when the slider 142 having the magnetic head 141 is accommodated in the parking zone 121 on the lower surface of the disk 120, according to an aspect of the present invention, the dummy slider 152 is positioned at an outer side of the slider 142 (i.e., the dummy slider 152 is positioned further in distance from the slider 142 in a radial direction from center of the disk 120 or the dummy slider 152 is positioned outside of the slider 142 in a radial direction). That is, the dummy slider 152 is disposed at the outer circumferential side of the disk 120 rather than the inner circumferential side of the disk 120. This is because linear velocity at the outer circumferential side of the disk 120 is faster, so that the dummy slider 152 is lifted more easily and greater moment can be applied to the disk 120 by the same force. Also, since data is not recorded on the upper surface of the disk 120, the dummy slider 152 does not need to be installed close to the inner circumferential side of the disk 120 (for example, close to the parking zone 121).

Figure 7:
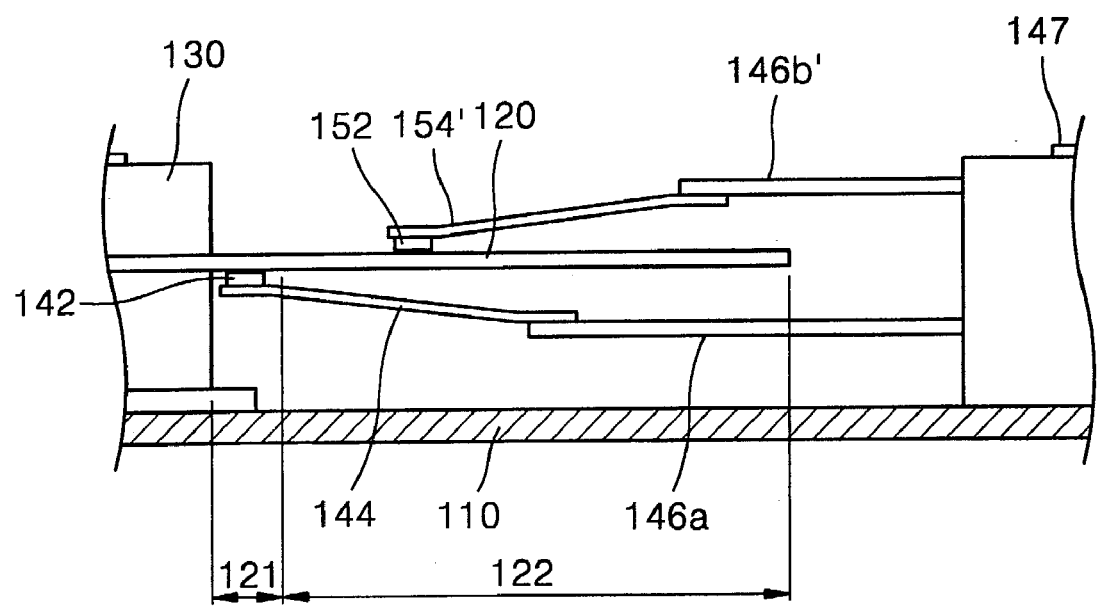
FIG. 7 is a side view illustrating a modified example of the disk locking apparatus shown in FIG. 4.

As shown in FIGS. 5 and 6, the length of the dummy suspension 154 is shorter than the length of the suspension 144 under the disk 120. Accordingly, the dummy slider 152 installed at the end portion of the dummy slider 154 is disposed at the outer side of the slider 142 installed at the end portion of the suspension 144. As shown in FIG. 7, the same effect as above can be obtained by making the length of a second arm 146b' where a dummy suspension 154' is installed shorter than that of the first arm 146a where the suspension 144 is installed, and making the lengths of the dummy suspension 154' and the suspension 144 equal.

Figure 8:
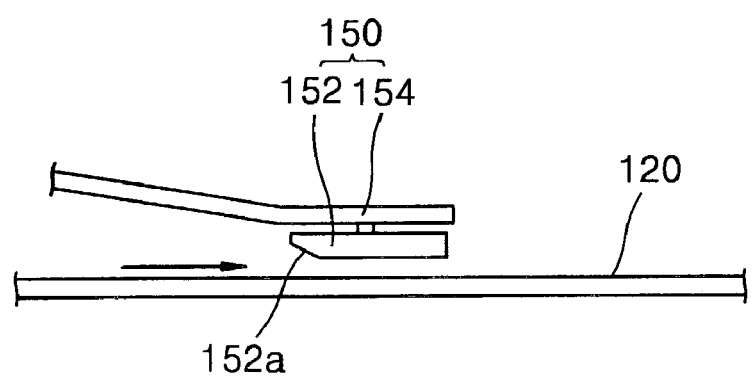
FIG. 8 is an enlarged side view illustrating a dummy slide portion of the disk locking apparatus shown in FIG. 4.

As shown in FIG. 8, an inclined surface 152a is formed at the side of dummy slider 152 facing a direction in which the disk 120 rotates as indicated by an arrow in the drawing. This is to generate a difference in pressure to lift the dummy slider 152. Any dummy slider having a different shape from the dummy slider 152 shown in FIG. 8 may be used if it can generate such a difference in pressure. Also, since the lift height of the dummy slider 152 does not need to be accurately controlled, unlike the slider 144 having the magnetic head 142, the dummy slider 152 does not need a complicated structure. Also, to prevent generation of unbalanced forces from both sides of the disk 120 during the rotation of the disk 120, typically the disk locking apparatus 150 weighs as much as a sum of the suspension 144 and the slider 142 under the disk 120. For example, because the weights of the magnetic head 141, and a wire (not shown) that is connected to the magnetic head in case of an operational slider 142 are tiny and ignorable, the same members as the suspension 144 and the slider 142 under the disk 120, respectively, can be used as the dummy slider 152 and the dummy suspension 154 of the disk locking apparatus 150. Further, in a case the locking apparatus 150 uses the same members as an operational (recording/reproducing slider 142), the wire may be omitted (e.g., physically or functionally omitted).

The operation of a hard disk drive shown in FIGS. 4–8 will now be described. When the power of the hard disk drive is turned off or when the disk 120 is stopped, that is, during the non-operation of the hard disk drive, the slider 142 having the magnetic head 141 is accommodated in the parking zone 121 on the lower surface of the disk 120 by the elastic force of the suspension 144. Further, during such non-operation, the dummy slider 152 closely contacts the upper surface of the disk 120 by the elastic force of the dummy suspension 154. Thus, the disk 120 is prevented from rotating by the dummy slider 152 and the slider 142 closely contacting both side surfaces of the disk 120, respectively. In particular, for example, when the hard disk drive is shaken as it is being carried, the disk 120 is not rotated.

When the disk drive is operating, for example, when power is turned on or the disk drive receives a data record/reproduce command, and the disk 120 begins rotating, lift is generated by air pressure so that the slider 142 having the magnetic head 141 is lifted. The slider 142 being lifted is moved to the data zone 122 of the disk 120 as the first arm 146a pivots. The slider 142 moved in the data zone 122 of the disk 120 maintains a lifted state at a height where the lift by the rotation of the disk 120 and the elastic force by the suspension 144 are balanced. Accordingly, the magnetic head 141 mounted on the slider 142 records and reproduces data on and from the disk 120 while maintaining a predetermined distance from the rotating disk 120. Simultaneously, the dummy slider 152 is lifted by the lift generated by the rotation of the disk 120 to be separated a predetermined distance from the upper surface of the disk 120. Thus, during the operation of the hard disk drive, the rotation of the disk 120 is not prevented by the dummy slider 152.

As described above, in the hard disk drive having a disk locking apparatus according to the present invention, when the hard disk drive is not operated, for example, when the hard disk drive is being carried, the stopped disk is not rotated by the disk locking apparatus so that damage to the bearing of the spindle motor due to the rotation of the stopped disk is prevented. Accordingly, since disk vibrations generated by a damaged bearing of the spindle motor is prevented, data recording/reproduction capability and reliability are improved. Also, noise due to such disk vibrations can be reduced.

Typically, the disk locking apparatus of the present invention is provided in a hard disk drive installed in a computer and advantageously prevents damage to the spindle motor bearings of a stopped spindle motor or a stopped disk coupled to the spindle motor by preventing movement of the stopped spindle motor or the stopped coupled disc due to movement of the hard disk drive or the computer containing the hard disk drive. More particularly, the present invention provides in an odd channel type (e.g., 1, 3, 5, etc.) hard disk drive, a dummy slider functioning as a disk locking apparatus to prevent rotation of the disc when the hard disk drive is not operated, for example, when it is being carried. Further, the disk locking apparatus of the present invention prevents rotation of a relatively heavy disk, for example, a disk having a thickness of about 1.27 mm, when the hard disk drive is not operating (e.g., turned off or not receiving power, inactive while not recording/reproducing, etc.), thereby preventing damage to a stopped spindle motor ball bearing because of movement of the disk coupled to the spindle motor, such as rotation of the stopped disk, as weight and/or thickness of the disk increases. Advantageously, the present invention provides a method of locking a stopped heavy disk by contacting a non-recording surface of the stopped disk with a dummy slider on an elastically biasing suspension at a position at an outer side of a parked data slider contacting a recording surface of the stopped disk. The suspension has a predetermined elastic force that allows closely (forcefully or actively) contacting a surface of a stopped disk to lock in place the stopped disk.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A disk locking apparatus installed in a hard disk drive having an actuator with arms disposed at each recording and non-recording surface of a rotary disk, the disk locking apparatus comprising:

an elastically biased suspension installed at the arm of the disc drive actuator disposed at the non-recording surface of the disk; and a slider installed at the suspension and locking the rotary disk when stopped by contacting the non-recording surface of the disk, wherein the slider is disposed at a position at an outer side of a data slider in a radial direction, the parked data slider disposed at the recording surface of the disk.

2. A method of locking a stopped disk of a hard disc drive, comprising:

contacting a non-recording surface of the stopped disk with a dummy slider on an elastically biasing suspension at a position at an outer side of a parked data slider in a radial direction, the parked data slider contacting a recording surface of the stopped disk.

3. A hard disk drive comprising:

a disk storing data, having a parking zone and a data zone at a first side surface thereof;

a spindle motor installed on a base plate, and rotating the disk; and an actuator pivotally installed on the base plate and having a first arm disposed at the first side surface of the disk and a second arm disposed at a second side surface of the disk;

a suspension having a predetermined elastic force and installed at the first arm, and a slider with a mounted magnetic head recording and reproducing data installed at an end portion of the suspension to be elastically biased toward the disk by the suspension; and a disk locking apparatus installed, at the second arm, to be disposed at a position at an outer side of the slider in a radical direction, and locking the disk to prevent rotation by contacting the second side surface of the disk when the disk stops rotating.

4. The hard disk drive of claim 3, wherein the disk locking apparatus comprises:

a dummy suspension having one end portion fixedly installed at the second arm and which has a predetermined elastic force; and a dummy slider installed at the other end portion of the dummy suspension, and locking the disk to prevent rotation by contacting the second side surface of the disk by an elastic force of the dummy slider when the disk stops rotating.

5. The hard disk drive of claim 4, wherein, when the disk stops rotating, the dummy slider is installed to be disposed at a position at an outer side of the slider.

6. The hard disk drive of claim 5, wherein a length of the dummy suspension is shorter than that of the suspension.

7. The hard disk drive of claim 5, wherein a length of the second arm installed at the dummy suspension is shorter than that of the first arm.

8. The hard disk drive of claim 4, wherein an inclined surface is formed at a side of the dummy slider facing a rotating direction of the disk.

9. The hard disk drive of claim 3, wherein the disk has a thickness in an approximate range of 1 mm to 1.27 mm.

10. The hard disk drive of claim 5, wherein a length of the second arm is shorter than that of the first arm.

11. The hard disk drive of claim 10, wherein a length of the dummy suspension and the suspension are equal.

12. The hard disk drive of claim 6, wherein a length of the first arm and the second arm are equal.

13. The hard disk drive of claim 3, wherein the disk locking apparatus weighs as much as a sum of the suspension and the slider.

14. The hard disk drive of claim 5, wherein the dummy suspension and the dummy slider have the same configuration as the suspension and the slider, respectively.

15. A hard disk drive, comprising:

at least two rotary disks storing data and having a parking zone and a data zone at an odd number of surfaces thereof;

an actuator having arms disposed at each surface of the disks;

suspensions installed at each arm and elastically biased toward each surface of the disks;

data sliders recording and reproducing data installed at an end portion of each suspension biased toward the zoned surfaces of the disks; and a disk locking apparatus installed at an end portion of each suspension biased toward non-zoned surfaces of the disks and locking the disks when stopped by contacting the non-zoned surfaces of the stopped disks, wherein the disk locking apparatus is disposed at a position at an outer side of the data sliders in a radial direction, the data sliders being disposed at the zoned surfaces of the disk.

16. A hard disk drive comprising:

a disk storing data, having a parking zone and a data zone at a first side surface thereof;

a spindle motor installed on a base plate, and rotating the disk; and an actuator pivotally installed on the base plate and having a first arm disposed at the first side surface of the disk and a second arm disposed at a second side surface of the disk;

a suspension having a predetermined elastic force and installed at the first arm, and a slider with a mounted magnetic head recording and reproducing data installed at an end portion of the suspension to be elastically biased toward the disk by the suspension; and a disk locking apparatus installed, at the second arm, to be disposed at a vertically different position of the slider with the mounted magnetic recording and reproducing head, and locking the disk to prevent rotation by contacting the second side surface of the disk when the disk stops rotating.

* * * * *

UNITED STATES PATENT AND TRADEMARK OFFICE
CERTIFICATE OF CORRECTION

PATENT NO.        : 7,031,103 B2                                Page 1 of 1
APPLICATION NO.   : 10/387837
DATED             : April 18, 2006
INVENTOR(S)       : Yong-chul Yoo It is certified that error appears in the above-identified patent and that said Letters Patent is hereby corrected as shown below:

Column 8, line 53: after "the" delete "parked".

Column 8, line 53: after "slider" insert --being--.

Column 9, line 12: delete "radical" and insert --radial--therefor.

Signed and Sealed this

Fifteenth Day of August, 2006

JON W. DUDAS
*Director of the United States Patent and Trademark Office*